April 14, 1925.
D. G. LORRAINE
OIL AND GAS SEPARATOR
Filed Nov. 6, 1922
2 Sheets-Sheet 2
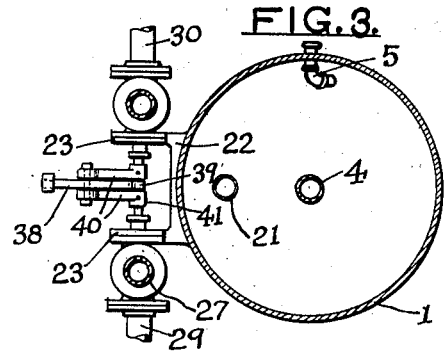
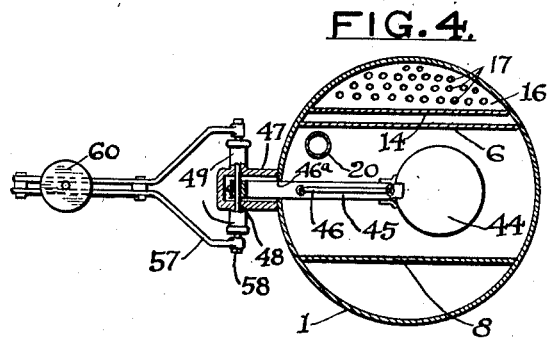
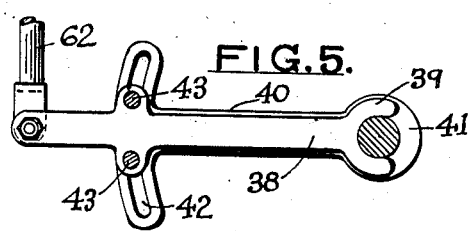
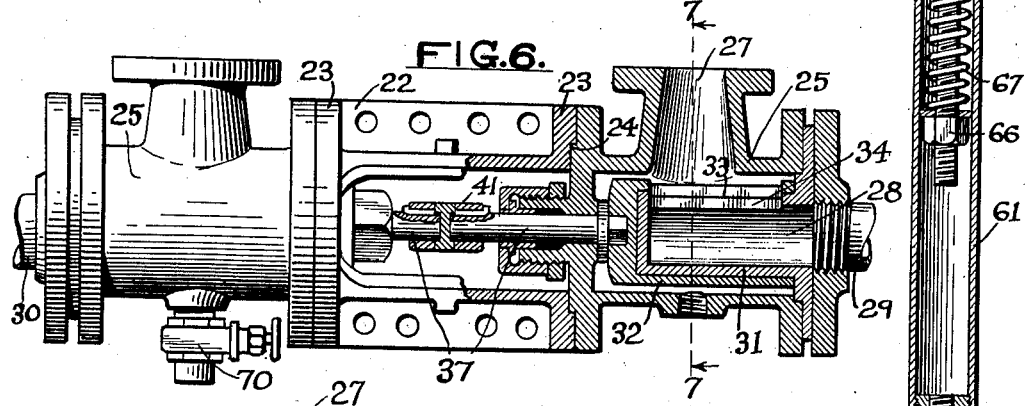
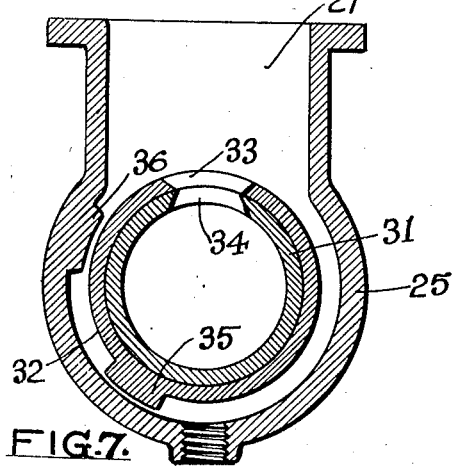
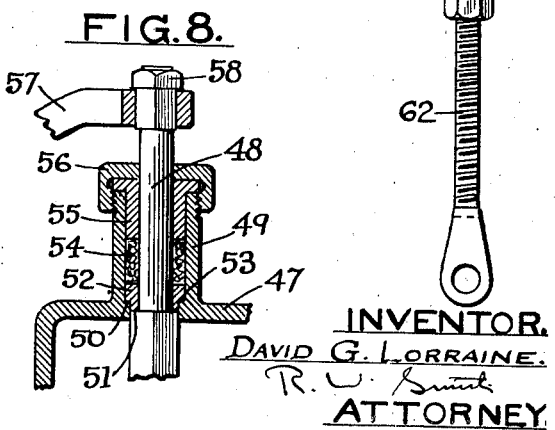
INVENTOR.
DAVID G. LORRAINE.
ATTORNEY Patented Apr. 14, 1925.

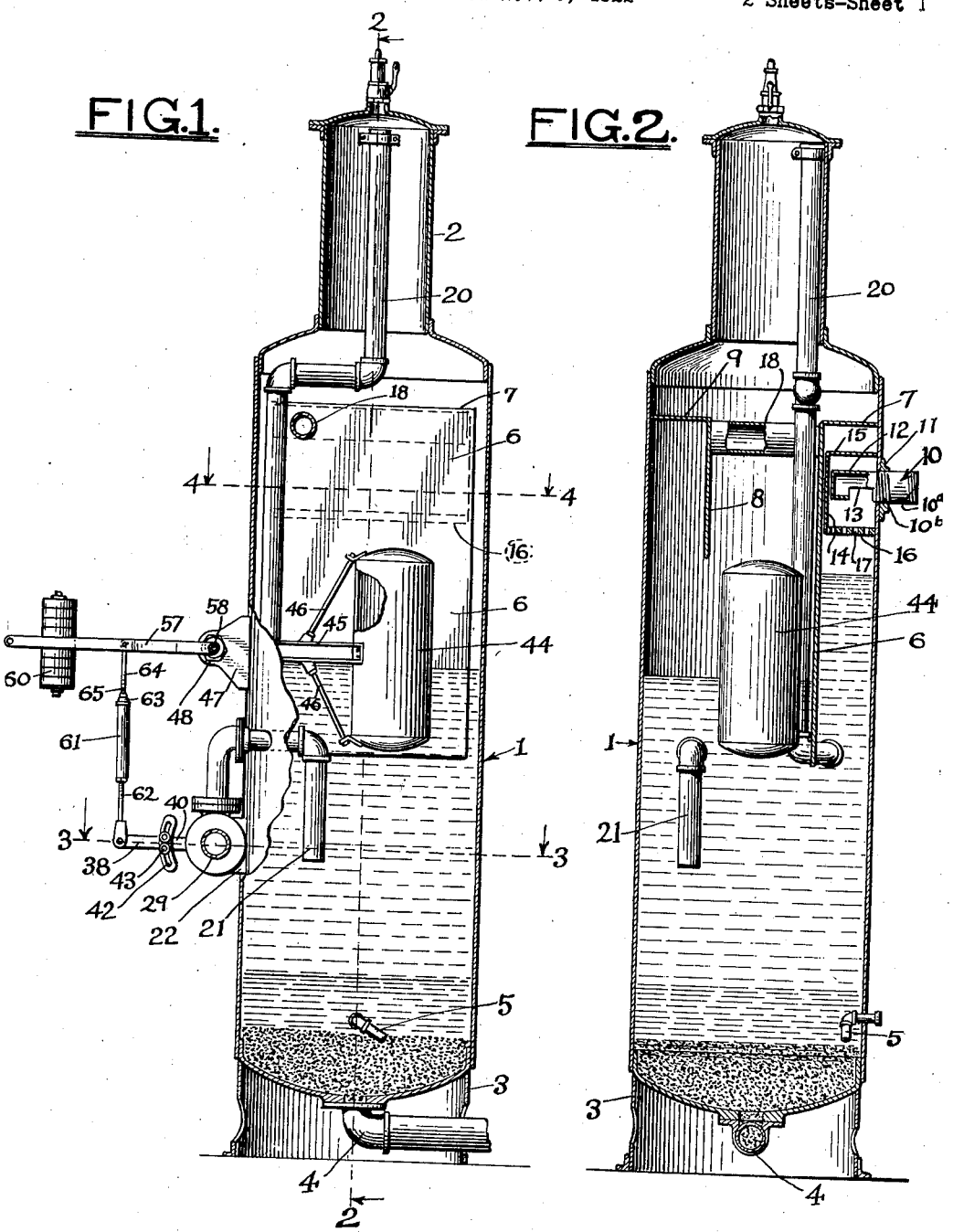

1,533,744

UNITED STATES PATENT OFFICE.

DAVID G. LORRAINE, OF LOS ANGELES, CALIFORNIA.

OIL AND GAS SEPARATOR.

Application filed November 6, 1922. Serial No. 599,420.

*To all whom it may concern:*

Be it known that I, DAVID G. LORRAINE, a citizen of the United States, residing at Los Angeles, county of Los Angeles, State of California, have invented new and useful Improvements in Oil and Gas Separators, of which the following is a specification.

This invention relates to the separation of the oil and gas, and the removal of sand and water from the flow of an oil well, my co-pending applications Serial No. 620,720, filed Feb. 23, 1923, and Serial No. 740,610, filed Sept. 29, 1924, being divisions of the present application.

It is the object of the invention to provide means for collecting the heavier constituents of the flow in a settling chamber where the sand and water will gravitate from the oil, and the gas will rise into a gas chamber; and to also provide means for collecting the lighter gas which rises from the flow before it reaches the settling chamber, in a scrubbing or cleaning chamber where any remaining oil mixed with said gas will drop to the settling chamber while the dry gas enters the gas chamber.

It is a further object of the invention to provide means whereby the entire flow passes through a perforated partition before entering the settling chamber and the gas chamber, in order to break up the flow for ready separation of the constituents thereof, and to also decrease the velocity of the flow so that it will enter the settling chamber without causing a churning action therein.

It is a still further object of the invention to provide a flow inlet arranged whereby the force of the incoming flow is not directed against the walls of the apparatus with the resulting cutting through of said walls, the flow being directed into the settling chamber without movement thereof down the side walls of the tank.

The invention further provides a flow inlet pipe forming a cushion of the incoming flow which is adapted to receive the full force thereof, the inlet pipe diverting the course of the flow so that the heavier constituents fall to the settling chamber.

The invention also provides for ready removal of the inlet pipe against which the force of the incoming flow is exerted, in order that said pipe may be replaced when worn.

It is a still further object of the invention to provide valvular means for the oil and gas discharges of the separator arranged whereby the relative opening and closing of said valves may be adjusted from a convenient point upon the outside of the separator.

The invention also provides for a float controlled operation of the valves, said operating means being yieldable to provide a cushioned action as the valves are seated in closed position.

The invention further provides a valvular construction whereby any sand accumulating in said valves may be readily removed.

It is a still further object of the invention to provide a separator having a gas discharge leading from the upper portion thereof, and extending downwardly inside of the separator and thence outwardly through the separator to a position alongside the oil discharge, where said discharges are connected to the valvular controls for the same. By this arrangement the gas conduit is protected during transportation and use of the separator, and the valve mechanism is readily accessible for adjustment.

The invention also provides means for washing out the sand and the like, accumulating in the bottom of the separator, said means operating so as to cause a rotary movement for thoroughly discharging the sand.

The invention will be readily understood from the following description of the accompanying drawings, in which:

Fig. 1 is a vertical section through a separator constructed in accordance with the invention.

Fig. 2 is a vertical section on the line 2—2 of Fig. 1.

Figs. 3 and 4 are transverse sections on the lines 3—3 and 4—4 of Fig. 1.

Fig. 5 is a detail elevation of the adjustable valve actuating means.

Fig. 6 is a detail elevation, partly in section, of the oil and gas discharge valves.

Fig. 7 is a transverse section on the line 7—7 of Fig. 6.

Fig. 8 is a detail section through one of the bearings for the float arm rock shaft.

Fig. 9 is a vertical section through the yieldable operating connection between the float and valves.

The separator consists of a closed casing 1 having the dome 2 at the top thereof and open to said casing. The casing is preferably supported upon a base 3. A sand discharge 4 is provided at the bottom of the casing, and in order to facilitate removal of sand a flush pipe 5 extends into the casing above the sand discharge and forms a nozzle inclined downwardly and extending circumferentially of the casing. By this arrangement, water discharged into the casing through the flush pipe will cause a rotary movement adapted to flush out all of the sand.

A transverse vertical partition 6 is arranged in the upper portion of the casing at one side thereof, the sides of said partition meeting the side wall of the casing to form a space separated by said partition from the main portion of the casing. This space is closed at its top by a horizontal partition 7 extending from partition 6 to the casing wall. The partition 6 extends downwardly to about midway of the height of the casing, and the side space formed by the partition is open to the main portion of the casing below said partition.

A second transverse vertical partition 8 is arranged in the upper portion of the casing parallel to partition 6 and at the opposite side of the casing, the sides of this partition also meeting the side wall of the casing to form a space behind said partition and separated thereby from the main portion of the casing. This space is closed at its top by a horizontal partition 9 extending from partition 8 to the casing wall, and the parts are so arranged that the upper portions of the opposite side spaces formed in the casing are in horizontal alinement. The lower edge of partition 8 terminates short of the lower edge of partition 6 a substantial distance, and the side space in back of partition 8 is open to the main portion of the casing below said partition.

The space in back of partition 6 is an inlet passageway for the flow from an oil well. As an instance of this arrangement a pipe 10 extends through the casing wall and into said space near the top thereof. The pipe has a threaded end 10ª for connecting the same to the pipe line from the well, and also has an intermediate threaded portion 10ᵇ adapted to be screwed into a threaded port 11 in the side of the casing, for removably fixing the pipe in position in order that it may be conveniently replaced when worn.

The portion of pipe 10 extending into the side space of the casing is horizontally disposed and has a closed end 12. A lateral opening 13 is provided in the underside of said portion of the pipe in spaced relation from the end 12, so that oil will collect in the closed end of the pipe beyond the lateral opening to form a cushion for the flow through the pipe.

A casing encloses the end of pipe 10 which projects into the flow inlet passageway formed by partition 6. This casing comprises a transverse vertical wall 14 in the inlet passageway parallel to partition 6 and spaced therefrom, with said wall extending across the end of pipe 10 and having its side edges connected to the wall of casing 1. A top wall 15 connects wall 14 and the side of casing 1 above pipe 10 and below partition 7; and in similar manner a bottom wall 16 connects wall 14 and the side of the main casing below pipe 10. The wall 16 is perforated as shown at 17, throughout its area.

By the construction as thus described it will be seen that the force of the flow through pipe 10 is expended against the cushion in the end of said pipe and against the end wall thereof, said flow gravitating through opening 13, and all of said flow passing through the perforations 17 which will further retard said flow and also break up the same.

The heavier constituents of the flow then fall directly through the passageway formed by partition 6, and without impingement of said flow against the wall of casing 1 or the partion 6. As a consequence the flow will not cut out the wall or partition of the main casing, and should said flow cut out the end of pipe 10, the latter may be readily replaced.

A pipe 18 connects partitions 6 and 8 at their upper portion and opens into the side spaces formed by said partitions, and the lighter gas which immediately separates from the heavier constituents of the flow in the inlet passageway formed by partition 6, will rise between said partition and the wall 14, and pass thence through pipe 18 into the upper portion of the side space formed by partition 8, and which is a scrubbing or cleaning chamber.

The lower portion of casing 1 forms a settling chamber receiving the flow from the inlet passageway, and in said settling chamber the heavier sand and water will sink below the oil, while dry gas will rise from the oil into the upper portion of casing 1 and into dome 2. The continued flow of gas through the pipe 18 into the scrubbing chamber formed by partition 8, will force said gas downwardly and around the lower edge of the partition so that any oil remaining mixed with the gas will thus be liberated so as to fall to the settling chamber. As a consequence only dry gas is collected in dome 2, while the oil is collected in the lower portion of casing 1, with sand and water below said oil where it may be withdrawn through pipe 4.

An oil outlet pipe is provided in the settling chamber and a gas outlet pipe is open to the dome 2. The gas outlet pipe 20 extends downwardly from dome 2 inside of casing 1, and the oil outlet pipe 21 and said gas outlet pipe extend outwardly through the casing wall in horizontal alinement, and are connected to valve mechanism which is in turn connected to suitable pipe lines for withdrawal of the oil and gas. By this arrangement, the valve mechanism may be positioned at a height permitting convenient access thereto, in order to adjust said valve mechanism and connect the pipe lines to the same. It will also be noted that positioning pipe 20 inside of the separator casing, will protect said pipe during transportation of the device.

The valve mechanism to which the pipes 20—21 are connected, includes a cradle 22 fixed upon the outside of the casing wall below pipes 20—21, said cradle having outwardly projecting transversely spaced supporting discs 23. These discs have annular shoulders 24 upon their outer surfaces in axial alinement transversely of the separator.

Valves of the type shown in my co-pending application Serial No. 346,967, filed December 23, 1919, are mounted upon discs 23 and are connected to pipes 20—21, respectively. Each of these valves includes a cylindrical casing 25 fixed at one end to one of the discs 23, said casings each having an annular shoulder 26 engaging shoulder 24 for positively alining the valve casings transversely of the separator.

An inlet port 27 in the top of each valve casing is connected to one of the pipes 20—21, and a discharge port 28 in the outer end of each valve casing is connected to one of the pipes 29—30, which are oil and gas discharge pipes, respectively.

A sleeve 31 is fixed in each of the valve casings, said sleeve having an open outer end communicating with discharge port 28. A rotatable sleeve 32 in the valve casing is received over sleeve 31 and is provided with a port 33 circumferentially alined with a port 34 in the upper portion of sleeve 31.

It will thus be seen that rotation of sleeve 32 will either aline ports 33—34 so as to permit flow through the valve and out of port 28, or will move port 34 out of alinement with port 33 so as to close the valve.

A radial lug 35 projecting from sleeve 32, is adapted to impinge against a cooperating lug 36 extending inwardly from the inner surface of valve casing 25, when sleeve 32 is turned to closed position, and the abutment of the lugs cooperating with the rotating force exerted upon the sleeve 32, will bind said sleeve to its seat upon sleeve 31 with a twisting force exerted diagonally across the valve, so as to tightly close the latter.

Operating shafts 37 are axially fixed to sleeves 32 of the two valves, and said shafts extend toward one another in axial alinement through bearings in the respective cradle discs 23.

An actuating arm 38 is provided with a forked end 39 journaled upon the ends of shafts 37, said shaft ends being spaced slightly apart. Arms 40 are positioned at each side of arm 38 and form bearings 41 at their inner ends which are keyed upon the respective shafts 37.

Circumferentially slotted members 42 are provided at the outer ends of arms 40 whereby said arms may be circumferentially adjusted relative to one another, and fixed in adjusted position relative to arm 38 by bolts 43 received through the slotted members 42 and through bolt openings in arm 38 alining with said slots.

A float in the separator is adapted to rock the arm 38 and the arms 40 fixed thereto, so as to control opening and closing of the valves; and it will be noted that the relative adjustment of arms 40 provides for adjusting the relative opening and closing of the valves.

The float is shown at 44, mounted in the main portion of casing 1 at the lower part of partition 6, said float having a supporting arm 45 and diagonal braces 46. The arm 45 extends through an elongated slot 46ª in the wall of casing 1 and into a bearing casing upon the exterior of said wall.

The bearing casing, shown at 47, is an integral casting open at one side, and elongated vertically at said side so as to fit over and close the slot 46ª, the edges of said casting being welded to the wall of casing 1 for eliminating flanges and the like.

A shaft 48 extends transversely of the separator through casing 47 at the outer portion thereof, with the end of arm 45 fixed thereon so that the rise and fall of the float will turn the shaft 48. Slot 46ª and the open side of casing 47 are of sufficient vertical height to permit rocking movement of arm 45 as the position of the float varies, and the outer side of casing 47 adjacent shaft 48 is of reduced vertical height, forming a casing with an outwardly converging top and bottom for reducing the amount of metal in said casing.

The walls of casing 47 form bearings for shaft 48, with packing means cooperating with said bearings to prevent leakage. As an instance of this arrangement, outwardly extending bearing sleeves 49 project from the walls of casing 47, said sleeves having interior shoulders 50 at their inner ends, with the shaft 48 extending through said sleeves.

The shaft is squared in cross-section at the portion thereof within casing 47, so that arm 45 may be fixed thereto by means of a square bearing at the end of said arm received on said square shaft. The portions of the shaft extending through the bearing sleeves are round in cross-section, forming shoulders 51 at the ends of the medial squared portion of the shaft.

A ring 52 is received in each bearing sleeve and is provided with a shoulder 53 whereby said ring is removably seated against the shoulder 50, and shoulder 51 upon the shaft 48 bears against the ring. Packing 54 is positioned around shaft 48 within the bearing sleeve and against ring 52, and a follower 55 is received over the shaft within the bearing sleeve and impinges against the packing.

A nut 56 having the round portion of shaft 48 extending outwardly therethrough, is threaded onto the end of sleeve 49 and bears against follower 55, so that tightening of said nut will expand the packing to form a leak-proof construction.

The portions of shaft 48 beyond the bearing sleeves are squared in cross-section, and outwardly projecting arms 57 having square bearings are fixed on said portions of the shaft, and may be retained in position by nuts 58 threaded onto the ends of the shaft.

The outer ends of arms 57 are laterally offset to a position alongside of one another, and a counter-weight 60 is mounted upon said juxtaposed arm ends, with an operating connection between an intermediate point along said arm ends and the outer end of rock arm 38.

This operating connection is a cushioned construction adapted to yield when arm 38 has been rocked to a position causing lugs 35—36 of a valve to impinge, and in which position said valve will be closed as previously described.

The cushioned operating connection includes a tube 61 having a rod 62 threaded in one end thereof, with the other end of said rod pivoted to arm 38. The opposite end of the tube has a cap 63 with a rod 64 slidable therethrough. The outer end of this rod is pivoted to arms 57 and a collar 65 on the rod is adapted to impinge against a cap 63 when the rod is forced downwardly by the rise of float 44, thereby forcing the tube 61 and rod 62 downwardly for rocking arm 38 to cause opening movement of the valves.

A nut 66 is threaded onto the end of rod 64 which extends into tube 61, and a spring 67 is mounted on said rod end between the nut and the cap 63. It will thus be seen that as float 44 falls, so as to elevate rod 64, the tube 61 and rod 62 will also be raised until arm 38 is so rocked as to cause the lugs 35—36 of a valve to impinge with said valve in closed position. Continued elevation of rod 64 will compress spring 67 so as to permit yielding of said rod with relation to tube 61 and rod 62.

In operating the separator as thus described, some sand may remain with the oil and gas, and collect in the casings of the discharge valves. In order to provide for convenient withdrawal of such sand, the valve casings 25 may be provided at the bottoms thereof with manually operated valve controlled drains 70.

It will be apparent that various changes may be made in the construction, combination, and arrangement of parts as thus described, without departing from the spirit of the invention.

What is claimed is:

1. A device of the character described comprising a tank having a flow inlet and forming a settling chamber and a gas chamber above said settling chamber, a discharge from said settling chamber, a valve for said discharge controlled by the level of the flow relative to the device, a gas discharge conduit extending downwardly from said gas chamber inside of said tank and thence outwardly through the wall thereof, and a valvular control for said gas discharge conduit in the portion thereof outside of said tank.

2. A device of the character described having a settling chamber and a gas chamber, a flow inlet, discharge means for said settling chamber and for said gas chamber, valves for the respective discharge means, a float in said settling chamber having an operating connection with said valves extending to the exterior of the device, and means at the exterior portion of said operating connection for adjusting the relative opening and closing of said valves.

3. A device of the character described having a settling chamber and a gas chamber, a flow inlet, discharge means for said settling chamber and for said gas chamber, valves for the respective discharge means, rocker arms upon the exterior of the device for operating the respective valves, means at the exterior of the device for adjusting said rocker arms relative to one another to control the relative opening and closing of said valves, a float in said settling chamber, and an operating connection between said float and said rocker arms.

4. A device of the character described having a settling chamber and a gas chamber, a flow inlet, a discharge, a valve for said discharge, a float in said settling chamber, an operating connection between said float and said valve adapted to move said valve toward open or closed position in response to any movement of said float, and cushioning means for said operating connection adapted to yield when said valve seats in closed position.

5. A device of the character described comprising a tank forming a settling chamber and a gas chamber, a float in said tank, a flow inlet, a discharge, a valve for said discharge controlled by said float, gravity discharge means for material accumulating in the bottom of said valve, and a valvular control for said gravity discharge means.

6. A device of the character described having a settling chamber and a gas chamber, a flow inlet, discharge means for said settling chamber and for said gas chamber, valves for the respective discharge means having rocker arms for actuating the same, a float in said settling chamber, an operating arm for said rock arms actuated by said float, said rocker arms having a common axis and arcuate slots adapted to be circumferentially adjusted relative to one another, and a fastening means received through said slots and said operating arm, the adjustment of said rocker arms varying the relative opening and closing of said valves.

7. A device of the character described comprising a tank forming a settling chamber and a gas chamber, a float in said tank, a flow inlet, a discharge, a valve casing in said discharge, valvular means in the upper portion of said valve casing controlled by said float, a gravity discharge from the lower portion of said valve casing for accumulated material, and a valvular control for said gravity discharge means distinct from said valve casing.

8. A device of the character described including a settling chamber having an outlet for withdrawal of accumulated material, and a flush pipe discharging into said settling chamber circumferentially thereof so as to cause rotary movement of said material.

9. A device of the character described comprising a tank forming a settling chamber and a gas chamber above said settling chamber, a discharge conduit leading from said settling chamber through the wall of said tank, a gas discharge conduit leading downwardly from said gas chamber inside of said tank and thence outwardly through the wall thereof, and cooperating valvular means for said discharge conduits.

10. A device of the character described comprising a tank forming a settling chamber and a gas chamber above said settling chamber, a discharge conduit leading from said settling chamber through the wall of said tank, a gas discharge conduit, means for supporting said gas discharge conduit against the inner surface of the wall of said tank so as to lead downwardly from said gas chamber inside of said tank and thence outwardly through said wall, and cooperating valvular means for said discharge conduits.

11. A device of the character described comprising a tank forming a settling chamber and a gas chamber above said settling chamber, a discharge conduit leading from said settling chamber through the wall of said tank, a gas discharge conduit leading downwardly from said gas chamber inside of said tank and thence outwardly through the wall thereof, valves for said discharge conduits, and a common actuating arm operatively connected to said valves.

In testimony whereof I have signed my name to this specification.

DAVID G. LORRAINE.